UNITED STATES PATENT OFFICE.

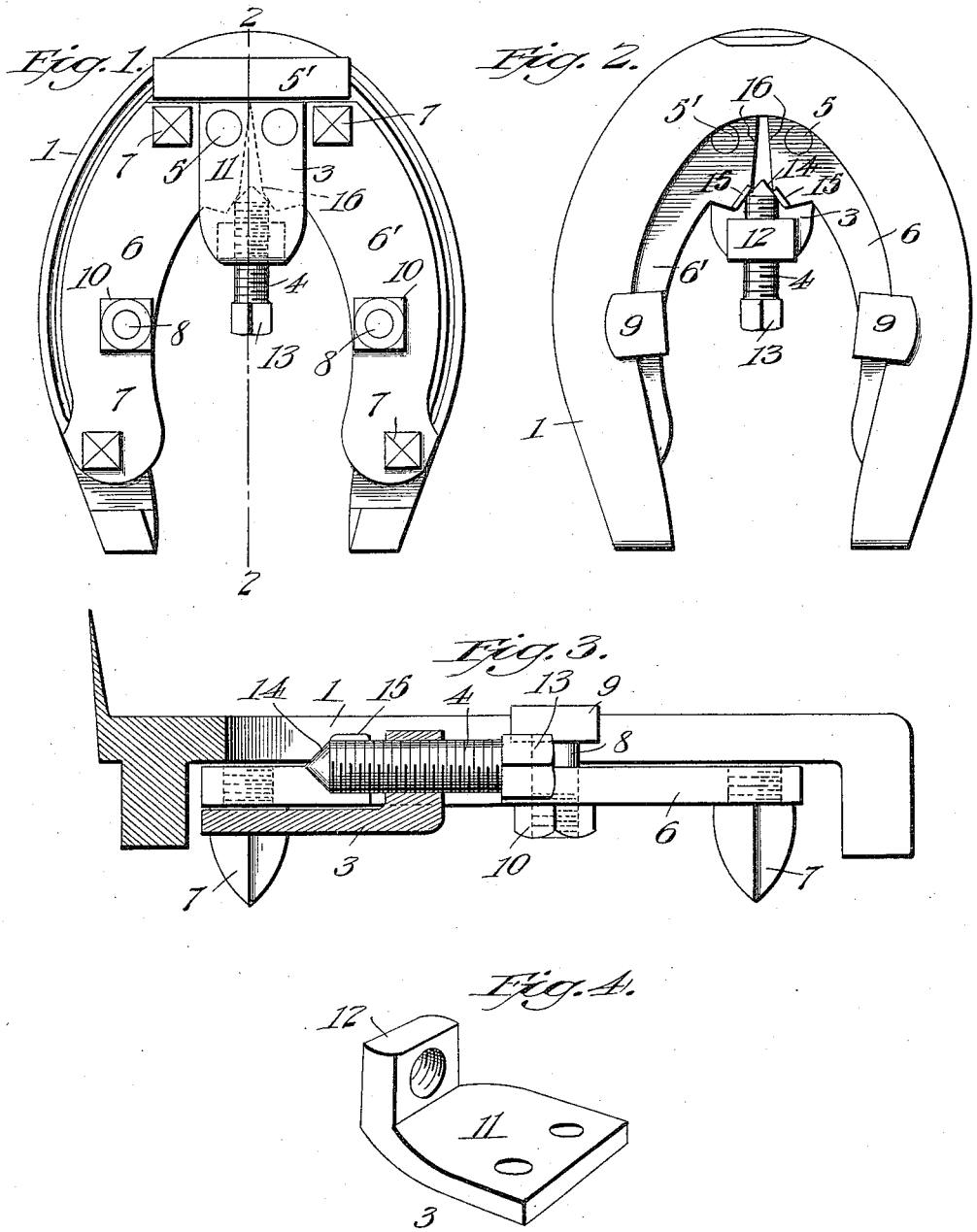

JOSEPH BUCKLAR, OF WASHINGTON, DISTRICT OF COLUMBIA, ASSIGNOR OF ONE-HALF TO H. A. FRANK, OF WASHINGTON, DISTRICT OF COLUMBIA.

CALK ATTACHMENT FOR HORSESHOES.

1,060,316. Specification of Letters Patent. Patented Apr. 29, 1913.

Application filed January 30, 1913. Serial No. 745,267.

*To all whom it may concern:*

Be it known that I, JOSEPH BUCKLAR, a citizen of the United States, residing at Washington, District of Columbia, have invented certain new and useful Improvements in Calk Attachments for Horseshoes, of which the following is a specification.

My invention relates to an improved calk attachment for horseshoes.

The primary object of this invention is to provide a device that can be readily connected to and removed from shoes of varying shapes and sizes, which device is secured by fastening devices which engage with the horseshoe already on the horse's hoof.

A further object is to furnish a device designed to be detachably applied to the ordinary horseshoe nailed on the horse's hoof, for the purpose of providing an easy and quickly applied anti-slipping attachment, said device including novel means whereby it will be rigidly locked upon a shoe, so that there will be no danger of accidental displacement, at the same time permitting of its ready removal when desired.

Another object of the invention is to provide an improved horseshoe attachment provided with novel locking means, which is so located that it is protected from engagement with the road or any hard objects which might injure it, and can be readily detached from any shoe without the necessity of altering or in any way changing the same.

The foregoing and such other objects as may occur from the ensuing description are accomplished by the means hereinafter more fully described, and by the construction, combination, arrangement and location of the parts illustrated in the accompanying drawings and particularly pointed out in the claims appended hereto.

Reference now being had to the accompanying drawings which form a part of this specification and in which similar numerals of reference indicate like parts, it will be seen that Figure 1, is an inverted plan view of a horseshoe with the improved calk attachment embodying my invention secured thereto. Fig. 2, is a plan view of said shoe and attachment. Fig. 3, is a longitudinal sectional view taken on the line 2—2, Fig. 1, and Fig. 4, is a detail perspective view of the plate which carries the locking and spreading means.

In carrying out my invention the attachment is readily connected to and removed from ordinary horse or mule shoes of varying sizes or shapes, and to either a plain smooth shoe or to one provided with projecting toe and heel portions.

As shown in the accompanying drawings 1 represents the ordinary horseshoe as nailed upon the horse's hoof in the usual way, to which my attachment is applied, and said attachment comprises a toe portion or member 3, said member carrying a locking and spreading bolt 4, and pivoted or hinged to said member 3, at 5, 5', are the two halves or sections 6, 6', which are made substantially alike and are so hinged as to permit them to be expanded or drawn together to fit the varying sizes and forms of horseshoe found on different horses or mules. The hinged sections are each of unitary character, that is to say, are made in one piece extending substantially from the heel of the horseshoe to the front or toe portion thereof. The said hinged sections or members 6, 6', are fitted with any suitable or desirable number of calks 7, which may be formed integral with said members or riveted or otherwise attached thereto, as by means of screw threads, in which latter case, said calks may be easily and readily removed and replaced, and various forms or shapes of calks may be used as well as various methods of attachment.

In order to hold the two hinged members 6, 6', of the attachment rigidly to the horseshoe, so that they cannot be accidentally disconnected therefrom, I provide each member with a threaded locking bolt 8, located at a suitable point intermediate its length and at the inner portion thereof, each bolt having an overlapping flange 9 at the head portion adapted to engage the upper surface of the inside edge of the shoe, as shown in Fig. 2, and to the lower threaded portion of each bolt is fitted a securing nut 10, by which the bolts are rigidly fastened to the shoe and prevent the attachment from accidentally coming off, as shown in Fig. 3.

The toe portion or member 3, (clearly shown in Fig. 4) consists of a flat forward portion 11, to which the members 6, 6', are hinged or pivoted at 5, 5', and at the rear thereof is an integral projecting portion 12 through which is formed a threaded opening adapted to receive a threaded locking and spreading bolt 4, having a headed portion 13, and a cone-shaped inner end portion 14, adapted to contact with the inwardly inclined and upwardly projecting lugs or ears 15 formed near the forward end of each of the hinged members.

By manipulating the bolt 4 in a forward direction toward the toe of the shoe, its smooth inner end will engage with the inclined upwardly projecting lugs 15 thereby forcing the hinged members apart, and the forward end of said bolt may be caused to engage the inside edges 16, formed near the forward end portion of the hinged members and further expand said members, the said bolt preventing contraction of the members while in contact with the edges 16, and serving to lock them in connection with the bolts 8 in their expanded position.

In the operation of my attachment and to adjust it to the shoe, the hinged members are moved about their pivotal points to a position that will permit the overlapping flange 9 of each bolt to enter into the inside peripheral edge of the shoe and engage with the top edge of the same. The spreading and locking bolt is now operated in a forward direction toward the toe of the shoe, which movement expands or forces the members 6, 6′, in an outward direction thus causing the locking bolts 8 to rest tightly against the inner side wall of the shoe, after which the securing nuts 10 are screwed up so as to rest in contact with the outer face of the hinged members, thereby holding the attachment rigidly to the shoe.

To remove the attachment it is only necessary to loosen the securing nuts 10, and reverse the movement of the spreading and locking bolt 4.

It will be readily perceived that the threaded bolt 4, serves to expand and force apart the hinged members 6, 6′, and when said members are in an expanded position the inner end of said bolt resting in contact with the inclined inner forward edges of the members will lock the said members in their expanded position, for the reason that it serves as a wedge between the members and prevents them from contracting or moving toward each other.

It will be understood that slight changes in the minor details of construction may be resorted to without departing from the spirit or sacrificing any of the advantages of the invention.

Having thus described my invention what I desire to claim and secure by Letters Patent is:—

1. A calk attachment for horseshoes comprising, a toe member, side members pivoted to the forward end of said toe member, said toe member having a rear projecting portion provided with a threaded opening, and a threaded bolt fitted in said opening adapted to spread the said members apart and lock them in such position.

2. A calk attachment for horseshoes comprising, a toe member, side members pivoted to the forward end of said toe member, each side member having an upwardly extended inclined lug near its forward end, said toe member having at its rear an integral projecting portion provided with a threaded opening, and a threaded bolt fitted in said opening, the forward end of said bolt being adapted to contact with said inclined lugs and expand the side members and hold them in the expanded position.

3. A calk attachment for horseshoes comprising, a toe member, side members pivoted to the said toe member so that the forward end of each rests on the upper surface of the toe member, each side member carrying a securing bolt intermediate its length. each bolt having a headed portion at one end and threaded at the other end, a securing nut for each bolt, said toe member being provided with an integral projecting portion having a threaded opening, and a threaded bolt fitted in said opening, the forward end of said bolt being adapted to spread the side members apart and secure them in such position.

4. A calk attachment for horseshoes comprising, a toe member, side members pivoted to the said toe member, each side member having an integral upwardly extended inclined lug near its forward end and carrying a securing bolt intermediate its length, each bolt having an extended head portion at one end and screw-threaded at the other end, a securing nut for each bolt, said toe member being provided with an integral projecting portion having a threaded opening, and a threaded bolt fitted in said opening, the forward end of said bolt being cone-shaped and adapted to spread the side members apart and retain them in their parted position.

5. In a calk attachment for horseshoes, the combination of a toe member with side members pivotally connected at their forward end to said toe member, of a spreader for said side members comprising a threaded bolt fitted into a threaded opening in the said toe member, the forward end of said bolt being cone-shaped and adapted to contact with the inner forward edge of each side member to force the side members apart and hold them in their parted position.

In testimony whereof I affix my signature in presence of two witnesses.

JOSEPH BUCKLAR.

Witnesses:
 CHAS. E. RIORDON,
 E. WILLIAMS.